United States Patent
Yue et al.

(10) Patent No.: US 10,801,943 B2
(45) Date of Patent: Oct. 13, 2020

(54) APPARATUS AND METHOD FOR MEASURING APPARENT PERMEABILITY OF TIGHT ROCK CORE

(71) Applicants: China University of Petroleum-Beijing, Beijing (CN); Beijing Shida Rongzhi Science and Technology Limited Company, Beijing (CN)

(72) Inventors: Xiang'an Yue, Beijing (CN); Weiqing An, Beijing (CN); Xuegang Feng, Beijing (CN); Lijuan Zhang, Beijing (CN); Jirui Zou, Beijing (CN); Xin Fang, Beijing (CN); Youjun Fu, Beijing (CN); Wei Fang, Beijing (CN); Junbin Zhang, Beijing (CN); Wenhao Tian, Beijing (CN); Jueshun Zhao, Beijing (CN); Bin Kong, Beijing (CN); Shengxu Zhao, Beijing (CN)

(73) Assignees: CHINA UNIVERSITY OF PETROLEUM-BEIJING, Beijing (CN); BEIJING SHIDA RONGZHI SCI. AND TECH. LTD. CO., Beijing (CN)

( * ) Notice: Subject to any disclaimer, the term of this patent is extended or adjusted under 35 U.S.C. 154(b) by 189 days.

(21) Appl. No.: 16/016,518

(22) Filed: Jun. 22, 2018

(65) Prior Publication Data
US 2018/0372611 A1    Dec. 27, 2018

(30) Foreign Application Priority Data

Jun. 26, 2017  (CN) .......................... 2017 1 0492520
Jun. 26, 2017  (CN) .......................... 2017 1 0492533

(Continued)

(51) Int. Cl.
*G01N 15/08*   (2006.01)
*G01L 13/00*   (2006.01)
*E21B 49/02*   (2006.01)

(52) U.S. Cl.
CPC ....... *G01N 15/0826* (2013.01); *E21B 49/025* (2013.01); *G01L 13/00* (2013.01); *G01N 15/0806* (2013.01); *E21B 49/02* (2013.01)

(58) Field of Classification Search
CPC .. G01N 15/08; G01N 15/082; G01N 15/0806; G01N 15/0826
See application file for complete search history.

(56) References Cited

U.S. PATENT DOCUMENTS 2,724,963 A * 11/1955  Ten Brink .......... G01N 15/0826
                                                         73/38
3,018,660 A *  1/1962  Schmid .................. G01N 33/24
                                                         73/152.09
(Continued)

FOREIGN PATENT DOCUMENTS

CN   103278430 A    9/2013
CN   104237098 A   12/2014
(Continued)

OTHER PUBLICATIONS

First Office Action and search report dated Jan. 23, 2018 for counterpart Chinese patent application No. 201710492533.X.

*Primary Examiner* — Alexander A Mercado
(74) *Attorney, Agent, or Firm* — Loza & Loza, LLP; Michael F. Fedrick

(57) ABSTRACT

The present application provides an apparatus and a method for measuring apparent permeability of a tight rock core, the apparatus comprises: a rock core holder, a first high-pressure injection pump, a second high-pressure injection pump, a micro-differential pressure meter, a micro-flow meter, a first pressure control unit, a second pressure control unit, a first (Continued)

valve, a second valve, a third valve, and a fourth valve; the first pressure control unit comprises: a first pressure-resistant piston container and a second pressure-resistant piston container, both of which are divided into an upper cavity and a lower cavity by a piston, the upper cavities of the first pressure-resistant piston container and the second pressure-resistant piston container are filled with gases and communicate with each other, and the lower cavity of the first pressure-resistant piston container is filled with pump pressure-transmission liquids, and the lower cavity of the second pressure-resistant piston container is filled with experimental fluids.

12 Claims, 6 Drawing Sheets

(30) Foreign Application Priority Data

Jun. 26, 2017 (CN) ...................... 2017 2 0746393 U
Jun. 26, 2017 (CN) ...................... 2017 2 0746442 U

(56) References Cited

U.S. PATENT DOCUMENTS

| | | | | |
|---|---|---|---|---|
| 4,253,327 A * | 3/1981 | Wiley | ................ | G01N 15/0826 73/38 |
| 4,304,122 A * | 12/1981 | Tentor | ................ | G01N 15/0826 73/152.07 |
| 4,487,056 A * | 12/1984 | Wiley | ................ | G01N 15/0826 73/38 |
| 4,538,452 A * | 9/1985 | Hrvojic | ............. | G01N 15/0618 73/290 V |
| 4,552,011 A * | 11/1985 | Wiley | ................ | G01N 15/0826 73/1.64 |
| 4,606,227 A * | 8/1986 | Walters | ................... | E21B 49/00 73/865.6 |
| 4,748,849 A * | 6/1988 | Jamison | ............ | G01N 15/0826 73/53.05 |
| 4,791,822 A * | 12/1988 | Penny | .................. | E21B 43/267 73/38 |
| 4,884,438 A * | 12/1989 | Jones | ................ | G01N 15/0826 73/152.11 |
| 4,922,758 A * | 5/1990 | Penny | .................. | E21B 43/267 73/38 |
| 5,018,396 A * | 5/1991 | Penny | .................. | E21B 43/267 73/865.6 |
| 5,245,859 A * | 9/1993 | Smith | ...................... | G01N 7/10 73/38 |
| 5,341,101 A * | 8/1994 | Maerefat | ............... | G01N 15/08 250/255 |
| 5,363,692 A * | 11/1994 | Lafargue | ............. | G01N 33/241 73/38 |
| 5,698,772 A * | 12/1997 | Deruyter | ........... | G01N 15/0826 73/38 |
| 7,082,812 B2 * | 8/2006 | Lenormand | ....... | G01N 15/0826 73/38 |
| 7,693,677 B2 * | 4/2010 | Egermann | ......... | G01N 15/0826 702/127 |
| 8,683,858 B2 * | 4/2014 | Piri | ..................... | G01N 15/082 73/152.06 |
| 9,377,392 B2 * | 6/2016 | Rickards | ............... | G01N 19/00 |
| 9,719,908 B1 * | 8/2017 | Bauer | ................. | G01N 15/082 |
| 10,168,265 B2 * | 1/2019 | Dwarakanath | ......... | E21B 43/16 |
| 10,443,363 B2 * | 10/2019 | Canalizo-Hernandez | ................... | G01N 33/241 |
| 10,444,218 B2 * | 10/2019 | Al-Otaibi | .............. | G01N 33/24 |
| 2005/0229680 A1 * | 10/2005 | Kfoury | ................ | G01N 15/082 73/38 |
| 2008/0134760 A1 * | 6/2008 | Egermann | ......... | G01N 15/0826 73/38 |
| 2010/0292110 A1 * | 11/2010 | Pope | ....................... | C09K 8/68 507/226 |
| 2012/0211089 A1 * | 8/2012 | Piri | ..................... | G01N 15/082 137/14 |
| 2013/0233536 A1 * | 9/2013 | Alqam | .............. | G01N 15/0806 166/250.01 |
| 2017/0167964 A1 * | 6/2017 | Liu | ................... | G01N 15/0826 |
| 2019/0187039 A1 * | 6/2019 | Su | ........................ | G01N 15/082 |
| 2019/0234859 A1 * | 8/2019 | Chen | ...................... | E21B 49/02 |

FOREIGN PATENT DOCUMENTS

| | | |
|---|---|---|
| CN | 104237107 A | 12/2014 |
| CN | 104297126 A | 1/2015 |
| CN | 205941297 U | 2/2017 |
| CN | 106802271 A | 6/2017 |
| CN | 106872328 A | 6/2017 |
| EP | 2006702 A2 | 12/2008 |

\* cited by examiner

APPARATUS AND METHOD FOR MEASURING APPARENT PERMEABILITY OF TIGHT ROCK CORE

CROSS-REFERENCE TO RELATED APPLICATIONS

This application claims the benefit of priority under 35 U.S.C. § 119 from Chinese Patent Application No. 201710492520.2, entitled "APPARATUS AND METHOD FOR MEASURING START-UP PRESSURE GRADIENT OF TIGHT ROCK CORE", submitted on Jun. 26, 2017; Chinese Patent Application No. 201710492533.X, entitled "TESTING APPARATUS AND TESTING METHOD FOR APPARENT PERMEABILITY OF TIGHT ROCK CORE", submitted on Jun. 26, 2017; Chinese Patent Application No. 201720746442.X, submitted on Jun. 26, 2017; and Chinese Patent Application No. 201720746393.X, submitted on Jun. 26, 2017, which are incorporated herein by reference in their entirety.

TECHNICAL FIELD

The present application relates to the field of experiments and analysis of a rock core, in particular to an apparatus and a method of measuring apparent permeability of a tight rock core under high pressure conditions.

BACKGROUND OF THE INVENTION

Up to now, methods of testing permeability of a rock core principally involve: a steady-state method, a transient pressure pulse attenuation method, a pore pressure oscillation method and a non-conventional steady-state method, etc. Its fundamental principle is based on Darcy formula for linear seepage flow, wherein a permeability value is a constant unrelated with pressure gradients (flow rate). However, the current research shows that permeability of a tight rock core ("tight rock core" means a material having a permeability of between $10^{\wedge}(-5)$ mD and 10 mD) is closely related to the pressure gradients (flow rate). Therefore, the existing traditional permeability testing principle and method are not applicable to a curve test of apparent permeability of a tight rock core, but solely applicable to moderately and highly permeable rock cores in agreement with Darcy linear seepage flow.

The seepage flow in the tight rock core occurs in regions where a non-flowing, low-speed non-linear seepage flow, a linear seepage flow and the like exist. Numerous experimental results demonstrate that the seepage flow in the tight rock core under high pressure environments does not follow the traditional and classical theories, which thus needs a model that can characterize nature and rules of characteristics of the seepage flow in the tight rock core and needs to be measured under high pressure environments for oil reservoirs. The technical bottleneck problem encountered in tests of apparent permeability of a tight rock core is stabilization and control of pressure and a real-time continuous measurement of a micro-flow rate under ultrahigh pressure environments for strata. However, the existing flow measurement techniques cannot meet requirements for tests of permeability of a tight rock core today.

In addition, currently, the commonly used method for measuring a start-up pressure gradient in a tight rock core uses a conventional seepage experimental device to measure a flow-pressure gradient curve, as illustrated in FIG. 1, a X-coordinate is the pressure gradient, a Y-coordinate is the flow, a linear part (i.e., the part where the flow is greater than point a) is typically at a Darcy linear stream stage, the part where the flow is smaller than the point a is at a low-speed Non-Darcy seepage stage, and the pressure gradient value corresponding to the flow of zero to which the linear part of the curve is extrapolated serves as a "start-up pressure gradient" (i.e., the X-coordinate value corresponding to point b). This method plays an important role in research and production of exploitation techniques for low permeability oil and gas reservoirs in an early stage. But as the research further develops, deficiencies of this method have gradually emerged. The pseudo "start-up pressure gradient" (point b) to which the linear part of the flow-pressure gradient is extrapolated is generally greater than the real start-up pressure gradient (point c). Owing to limitations of experiment measures, such as stabilization and control of pressure, high-pressure micro differential pressure and micro flow under high pressure environments, it cannot be measured accurately.

Another method of measuring a start-up pressure gradient in a tight rock core is fixing a back pressure at tail end of a rock core, where a boosting system at the head end is closed after a larger driving differential pressure is formed on both ends of the rock core, a differential pressure on both ends of the rock core and a flow are measured until the flow becomes zero and the fluctuation of the differential pressure tends to be stable, in this case, the pressure gradient in the rock core is considered as a "start-up pressure gradient". This method is an indirect method of measuring a change in a differential pressure on both ends when fluids in the rock core are gradually changed from a flowing state to a stationary state, and differences in fluids from the stationary state to the flowing state and fluids from the flowing state to the stationary state are not considered, and whether the result measured in such method is the real start-up pressure gradient or not still needs to be discussed.

SUMMARY OF THE INVENTION

The present application provides an apparatus and method for measuring apparent permeability of a tight rock core that can address the drawbacks that apparent permeability cannot be accurately obtained with limitations of stabilization and control of pressure under high pressure environments in the prior art.

One technical solution of this application is to provide an apparatus of measuring apparent permeability of a tight rock core, comprising:

a rock core holder, a first high-pressure injection pump, a second high-pressure injection pump, a micro-differential pressure meter, a micro-flow meter, a first pressure control unit, a second pressure control unit, a first valve, a second valve, a third valve, and a fourth valve;

wherein the first pressure control unit comprises: a first pressure-resistant piston container and a second pressure-resistant piston container, both of which are divided into an upper cavity and a lower cavity by a piston, the upper cavities of the first pressure-resistant piston container and the second pressure-resistant piston container are filled with gases and communicate with each other, and the lower cavity of the first pressure-resistant piston container is filled with pump pressure-transmission liquids, and the lower cavity of the second pressure-resistant piston container is filled with experimental fluids;

the second pressure control unit comprises: a third pressure-resistant piston container and a fourth pressure-resistant piston container, both of which are divided into an upper cavity and a lower cavity by a piston, the upper cavities of the third pressure-resistant piston container and the fourth pressure-resistant piston container are filled with gases and communicate with each other, and the lower cavity of the third pressure-resistant piston container is filled with pump pressure-transmission liquids, and the lower cavity of the fourth pressure-resistant piston container is filled with experimental fluids;

the upper cavities of the first, second pressure-resistant piston containers are connected with the upper cavities of the third, fourth pressure-resistant piston containers through the first valve, and the lower cavity of the first pressure-resistant piston container is connected with the second high-pressure injection pump, the lower cavity of the second pressure-resistant piston container is connected with a first inlet of the rock core holder, the lower cavity of the third pressure-resistant piston container is connected with the second high-pressure injection pump through the second valve, the lower cavity of the fourth pressure-resistant piston container, the fourth valve, the micro-flow meter, the third valve and an outlet of the rock core holder are connected in turn;

the rock core holder is used to accommodate a rock core sample;

the first high-pressure injection pump is connected with a second inlet of the rock core holder for adjusting a confining pressure;

the second high-pressure injection pump is used to provide a pressure;

the micro-differential pressure meter is connected between the first inlet and the outlet of the rock core holder for measuring a differential pressure; and the micro-flow meter is used to measure a dynamic flow.

This application further provides a method of measuring apparent permeability of a tight rock core, which is adapted for the apparatus of measuring a start-up pressure gradient of the tight rock core in the above-mentioned embodiment, comprising steps of:

loading a rock core sample into a rock core holder, and adjusting a confining pressure by a first high-pressure injection pump;

opening a third valve and a fourth valve, controlling a second high-pressure injection pump for applying pressure, so that experimental fluids in a lower cavity of a second pressure-resistant piston container are injected into the rock core sample, and the second high-pressure injection pump is stopped once the differential pressure the micro-differential pressure meter measures becomes stable;

closing the third valve and the fourth valve, opening a first valve and a second valve, controlling the second high-pressure injection pump for applying a pressure, so as to adjust the pressure in a first pressure control unit and a second pressure control unit to an experimental pressure; and closing the first valve and the second valve, opening the third valve and the fourth valve, controlling the second high-pressure injection pump to inject pump pressure-transmission liquids in a first ladder boosting mode, recording the dynamic differential pressure the micro-differential pressure meter measures and the dynamic flow the micro-flow meter measures after each boosting has stabilized; and calculating apparent permeability according to the dynamic differential pressure and the dynamic flow recorded after each boosting has stabilized.

By the technical solutions of the present application, tests of the simulated reservoirs in a high pressure environment can be performed, stabilization and control of pressure in the high pressure environment can be performed, the apparent permeability can be accurately measured with characteristics of high measurement accuracy and simple operations.

BRIEF DESCRIPTION OF THE DRAWINGS

To illustrate the technical solutions in the embodiments of the present application or in the prior art more clearly, the accompanying drawings required for describing the embodiments or the prior art are briefly introduced below. Apparently, the accompanying drawings in the following description merely illustrate some embodiments of the present application. Other drawings may also be obtained for those skilled in the art based on these drawings without creative efforts.

DETAILED DESCRIPTION OF THE INVENTION

The technical solutions in the embodiments of the present application are clearly and completely described below with reference to the accompanying drawings in the embodiments of the present application. Apparently, the described embodiments are only a portion but not all of the embodiments of the present application. All other embodiments obtained by those skilled in the art based on the embodiments of the present application without creative efforts shall fall within the protection scope of the present application.

Unless specified otherwise, the connections mentioned herein refer to pipeline connections.

Figure 2:
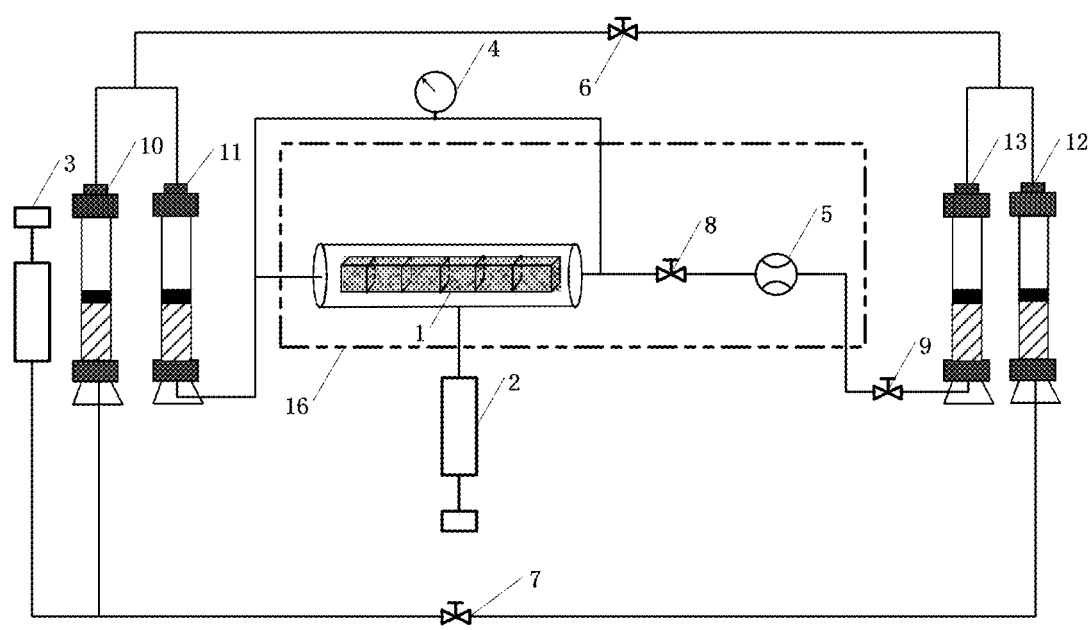
FIG. 2 is a structural diagram illustrating an apparatus of measuring apparent permeability of a tight rock core in one embodiment of the present application.

As illustrated in FIG. 2, FIG. 2 is a structural diagram illustrating an apparatus of measuring apparent permeability of a tight rock core in an embodiment of the present application. The apparatus of measuring apparent permeability of a tight rock core provided in this embodiment can implement tests of the simulated reservoirs in a high pressure environment, and stabilization and control of pressure in the high pressure environment.

To be specific, the apparatus of measuring a start-up pressure gradient of the tight rock core comprises: a rock core holder 1, a first high-pressure injection pump 2, a second high-pressure injection pump 3, a micro-differential pressure meter 4, a micro-flow meter 5, a first pressure control unit, a second pressure control unit, a first valve 6, a second valve 7, a third valve 8, and a fourth valve 9.

Wherein the first pressure control unit comprises: a first pressure-resistant piston container 10 and a second pressure-resistant piston container 11, both of which are divided into an upper cavity and a lower cavity by a piston, the upper cavities of the first pressure-resistant piston container 10 and the second pressure-resistant piston container 11 are filled with gases and communicate with each other, and the lower cavity of the first pressure-resistant piston container 10 is filled with pump pressure-transmission liquids, and the lower cavity of the second pressure-resistant piston container 11 is filled with experimental fluids.

The second pressure control unit comprises: a third pressure-resistant piston container 12 and a fourth pressure-resistant piston container 13, both of which are divided into an upper cavity and a lower cavity by a piston, the upper cavities of the third pressure-resistant piston container 12 and the fourth pressure-resistant piston container 13 are filled with gases and communicate with each other, and the lower cavity of the third pressure-resistant piston container 12 is filled with pump pressure-transmission liquids, and the lower cavity of the fourth pressure-resistant piston container 13 is filled with experimental fluids.

The upper cavities of the first, second pressure-resistant piston containers 10, 11 are connected with the upper cavities of the third, fourth pressure-resistant piston containers 12, 13 through the first valve 6, and the lower cavity of the first pressure-resistant piston container 10 is connected with the second high-pressure injection pump 3, the lower cavity of the second pressure-resistant piston container 11 is connected with a first inlet of the rock core holder 1, the lower cavity of the third pressure-resistant piston container 12 is connected with the second high-pressure injection pump 3 through the second valve 7, the lower cavity of the fourth pressure-resistant piston container 13, the fourth valve 9, the micro-flow meter 5, the third valve 8 and an outlet of the rock core holder 1 are connected in turn.

The rock core holder 1 is used to accommodate a rock core sample; the first high-pressure injection pump 2 is connected with a second inlet of the rock core holder 1 for adjusting a confining pressure; the second high-pressure injection pump 3 is used to provide a pressure; the micro-differential pressure meter 4 is connected between the first inlet and the outlet of the rock core holder 1 for measuring a dynamic differential pressure; and the micro-flow meter 5 is used to measure a dynamic flow.

In details, the experimental fluids include: gas, oil, water, polymer solutions, etc., which are not concretely defined in the present application.

Prior to operations of the apparatus of measuring apparent permeability of the tight rock core, valves are at a closed state. An access to the micro-flow meter 5 can be allowed and an experiment path is opened by closing the first valve 6 and the second valve 7, and opening the third valve 8 and the fourth valve 9. A testing path can be disconnected and an experimental pressure is set by closing the third valve 8 and the fourth valve 9, opening the first valve 6 and the second valve 7.

The first pressure control unit is designed to implement slow stabilization and control of pressure. The procedures of the stabilization and control of pressure for the first pressure control unit are as follows: injecting the pump pressure-transmission liquids pumped out by the second high-pressure injection pump into the lower cavity of the first pressure-resistant piston container, after that, pushing a piston of the first pressure-resistant piston container upwards, moving the piston upwards can compress the gas in the upper cavity of the first pressure-resistant piston container, compressing the gas in the upper cavity of the first pressure-resistant piston container can promote compression of the gas in the upper cavity of the second pressure-resistant piston container, compressing the gas in the upper cavity of the second pressure-resistant piston container can push the piston downwards, when accessing the flow meter, injecting experimental fluids in the lower cavity of the second pressure-resistant piston container into a rock core sample, and when not accessing the flow meter, boosting the pressure in the first pressure control unit.

When the second pressure control unit is connected with the first pressure control unit, it is used for pressure balancing so as to keep the entire apparatus under experiment pressure. When the lower cavity of the fourth pressure-resistant piston container in the second pressure control unit is connected with the micro-flow meter, it is used for recovering the liquids.

Figure 3:
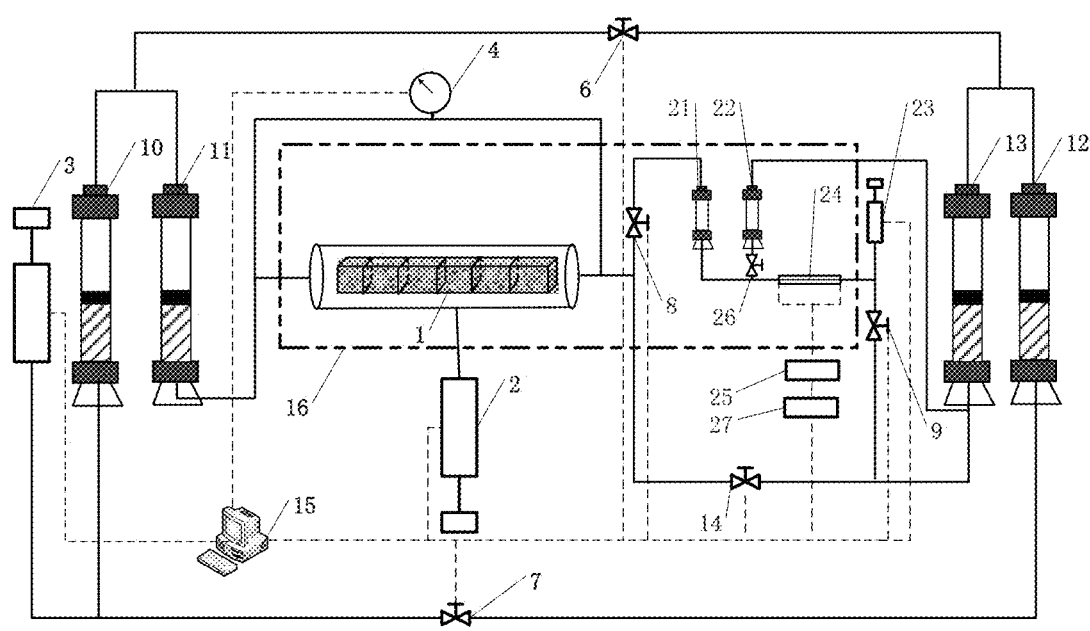
FIG. 3 is a structural diagram illustrating an apparatus of measuring apparent permeability of a tight rock core in another embodiment of the present application.

As illustrated in FIG. 3, the micro-flow meter comprises: a first pressure-resistant container 21, a second pressure-resistant container 22, a high-pressure micro-flow pump 23, a pressure-resistant capillary 24, a resistance measuring device 25, a fifth valve 26 and a calculator 27;

the first pressure-resistant container 21 is filled with measurement fluids, which are conductive liquids different from the experimental fluids, one end of the first pressure-resistant container 21 is connected with the outlet of the rock core holder 1 by the third valve 8, and the other end of the first pressure-resistant container 21 is connected with a head end of the pressure-resistant capillary 24;

the second pressure-resistant container 22 is filled with gases, one end of the second pressure-resistant container 22 is connected with the lower cavity of the fourth pressure-resistant piston container 13, and the other end of the second pressure-resistant container 22 is connected with a head end of the pressure-resistant capillary 24 by the fifth valve 26;

a tail end of the pressure-resistant capillary 24 is connected with the high-pressure micro-flow pump 23, connected with the lower cavity of the fourth pressure-resistant piston container 13 by the fourth valve 9, and the pressure-resistant capillary is preset with non-conductive liquids incompatible with the measurement fluids;

a resistance measuring device 25 is electrically connected with both ends of the pressure-resistant capillary 24 by signal lines for measuring a resistance of fluids in the pressure-resistant capillary 24;

a calculator 27 is electrically connected with the resistance measuring device 25 for calculation of a dynamic flow according to the resistance value measured by the resistance measuring device 25.

The calculator calculates the dynamic flow in the equation below:

$$Q_t = A'(h_t - h_{i0})/(t_t - t_{i0}), h_t = -aR_t + b;$$

where $Q_t$ is a flow at t moment; $A'$ is a cross-sectional area of the pressure-resistant capillary; $h_{i0}$ is an initial liquid level of the pressure-resistant capillary; $h_t$ is a liquid level at t moment; $t_t$ is a measurement moment; $t_{i0}$ is the moment corresponding to the $i^{th}$ initial liquid level; $R_t$ is a resistance value measured by the resistance measuring device at t moment; a and b are constants.

The micro-flow meter provided in this embodiment can realize an uninterrupted measurement of micro flow. The procedures of the uninterrupted measurement can refer to subsequent embodiments, which will be not described in more detail here.

In some embodiments of the present application, the rock core holder is a multi-measuring point rigid rock core holder, so as to eliminate effects on elasticity of components, e.g., a sealant cartridge.

In some embodiments of the present application, in order to ensure the experiment continuing when adjusting the micro-flow meter, as illustrated in FIG. 3, the apparatus of measuring a start-up pressure gradient of the tight rock core further comprises a sixth valve 14 connected between the outlet of the rock core holder 1 and the lower cavity of the fourth pressure-resistant piston container 13, and further connected with the fourth valve 9.

In some embodiments of the present application, the apparatus of measuring apparent permeability of a tight rock core further comprises: a data collector connected with the micro-differential pressure meter and the micro-flow meter for recording a dynamic differential pressure and a dynamic flow.

In some embodiments of the present application, the apparatus of measuring apparent permeability of a tight rock core further comprises: a controller 15 connected with the first high-pressure injection pump 2, the second high-pressure injection pump 3, the first valve 6, the second valve 7, the third valve 8 and the fourth valve 9 for controlling operations of the first high-pressure injection pump 1 and the second high-pressure injection pump 2 according to a user's setting, and opening or closing the first valve 6, the second valve 7, the third valve 8, and the fourth valve 9 according to the user's setting.

During implementation, the data collector and the controller can be implemented by a computer device. The calculator in the micro-flow meter can be integrated on that computer. The computer can also control the fifth valve 26 and the sixth valve 14.

In some embodiments of the present application, in order to simulate formation temperature, as illustrated in FIG. 3, the apparatus of measuring apparent permeability of a tight rock core further comprises a thermostat container 16 in which the rock core holder 1 and the micro-flow meter 5 are arranged.

Figure 4:
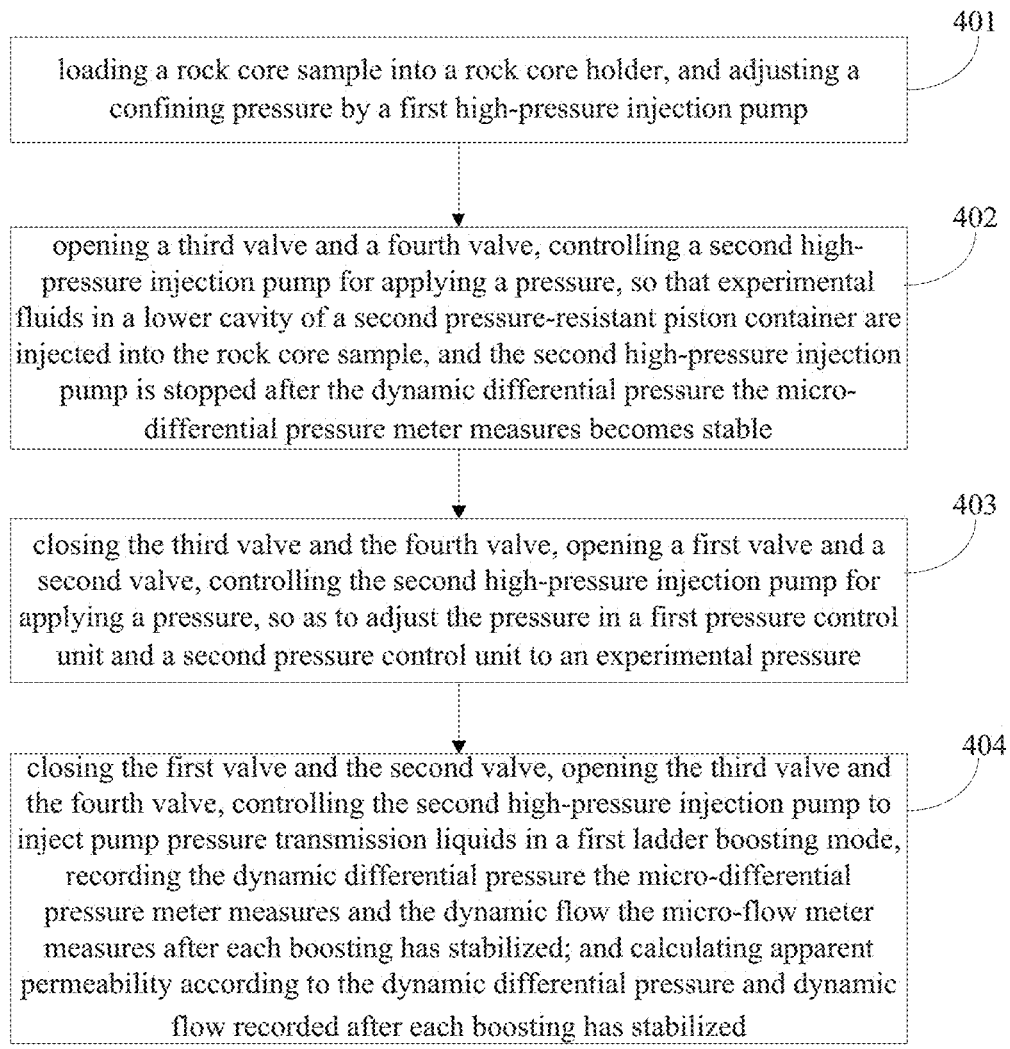
FIG. 4 is a structural diagram illustrating a method of measuring apparent permeability of a tight rock core in one embodiment of the present application.

As illustrated in FIG. 4, FIG. 4 is a flowchart illustrating a method of measuring apparent permeability of a tight rock core in an embodiment of the present application, which is adapted for the apparatus of measuring apparent permeability of a tight rock core as illustrated in FIGS. 2 and 3, before the method is implemented, valves are at a closed state, and opening or closing the valves are controllable by a person or a controller.

To be specific, a method of measuring a start-up pressure of a tight rock core, comprising:

Step 401: loading a rock core sample into a rock core holder 1, and adjusting a confining pressure by a first high-pressure injection pump 2.

During implementation, it needs to stand a period of time after adjusting the confining pressure to a set confining pressure by the first high-pressure injection pump.

Preferably, Step 401 further comprises: adjusting the temperature of the thermostat container to the formation temperature.

Step 402: opening a third valve 8 and a fourth valve 9, controlling a second high-pressure injection pump 3 for applying a pressure, so that experimental fluids in a lower cavity of a second pressure-resistant piston container 10 are injected into the rock core sample, and the second high-pressure injection pump 3 is stopped for applying a pressure after the differential pressure the micro-differential pressure meter 4 measures becomes stable.

Controlling the second high-pressure injection pump for applying a pressure, so that experimental fluids in the lower cavity of the second pressure-resistant piston container are injected into the rock core sample, comprising: controlling the second high-pressure injection pump to inject the pump pressure-transmission liquids to the lower cavity of the first pressure-resistant piston container in a manner of constant flow rate or constant pressure, and injecting the experimental fluids in the lower cavity of the second pressure-resistant piston container into the rock core sample via pressure transmission, and stopping the second high-pressure injection pump after the differential pressure the micro-differential pressure meter measures becomes stable.

The pressure transmission includes the following procedures: a piston can be pushed upwards after injecting the pump pressure-transmission liquids are into the lower cavity of the first pressure-resistant piston container, moving the piston upwards can compress the gas in the upper cavity, compressing the gas in the upper cavity of the first pressure-resistant piston container can promote compression of the gas in the upper cavity of the second pressure-resistant piston container, compressing the gas in the upper cavity of the second pressure-resistant piston container can push the piston downwards, and then can inject the experimental fluids in the lower cavity of the second pressure-resistant piston container into the rock core sample.

As gases have good compressibility, a slow and smooth transfer of pressure can be implemented, and hence the experimental fluids are slowly and smoothly injected into the rock core sample.

Step 403: closing the third valve 8 and the fourth valve 9, opening a first valve 6 and a second valve 7, controlling the second high-pressure injection pump 3 for applying a pressure, so as to adjust the pressure in a first pressure control unit and a second pressure control unit to an experimental pressure. The experimental pressure is used for simulating formation pressure, which is not especially limited in the present application and can be set as needed.

The first pressure control unit and the second pressure control unit can be communicated by opening the first valve and the second valve. Closing the third valve and the fourth valve can avoid outranging the experimental fluids when the experimental pressure is set.

The second high-pressure injection pump is controlled for applying pressure, so as to adjust the pressure in a first pressure control unit and a second pressure control unit to an experimental pressure, comprising: controlling the second high-pressure injection pump to inject the pump pressure-transmission liquids into the lower cavity of the first, third pressure-resistant piston containers in a manner of constant flow rate or constant pressure, and adjusting the pressure of the first pressure control unit and the second pressure control unit to the experimental pressure via pressure transmission.

Step 404: closing the first valve 6 and the second valve 7, opening the third valve 8 and the fourth valve 9, controlling the second high-pressure injection pump to inject pump pressure-transmission liquids in a first ladder boosting mode, recording the dynamic differential pressure the micro-differential pressure meter measures and the dynamic flow the micro-flow meter measures after each boosting has stabilized; and calculating apparent permeability according to the dynamic differential pressure and the dynamic flow recorded after each boosting has stabilized.

During implementation, calculating the apparent permeability in the equation below:

$$k = \frac{Q_t}{ADp_t} mL;$$

where k is the apparent permeability; $Q_t$ is the flow at t moment; μ is the tested media viscosity; L is the length of the rock core; A is the flow cross-sectional area of the rock core; and $Dp_t$ is the differential pressure measured by the differential pressure meter at t moment.

In one embodiment of the present application, the above-mentioned Step 404 further comprising prior to controlling the second high-pressure injection pump to inject pump pressure-transmission liquids in a first ladder boosting mode:

Step 501, controlling the second high-pressure injection pump to inject pump pressure-transmission liquids in a second ladder boosting mode, and recording the dynamic differential pressure the micro-differential pressure meter measures and the dynamic flow the micro-flow meter measures;

Step 502: drawing a pressure gradient dynamic curve according to the recorded dynamic differential pressure, and drawing a flow dynamic curve according to the recorded dynamic flow.

A relationship between the differential pressure and the pressure gradient is given as follows:

$$G_t = \frac{dP}{dL} = \frac{Dp_t}{L};$$

where $G_t$ is the pressure gradient at t moment; $Dp_t$ is the differential pressure the differential pressure meter measures at t moment; and L is the length of a rock sample.

Figure 5:
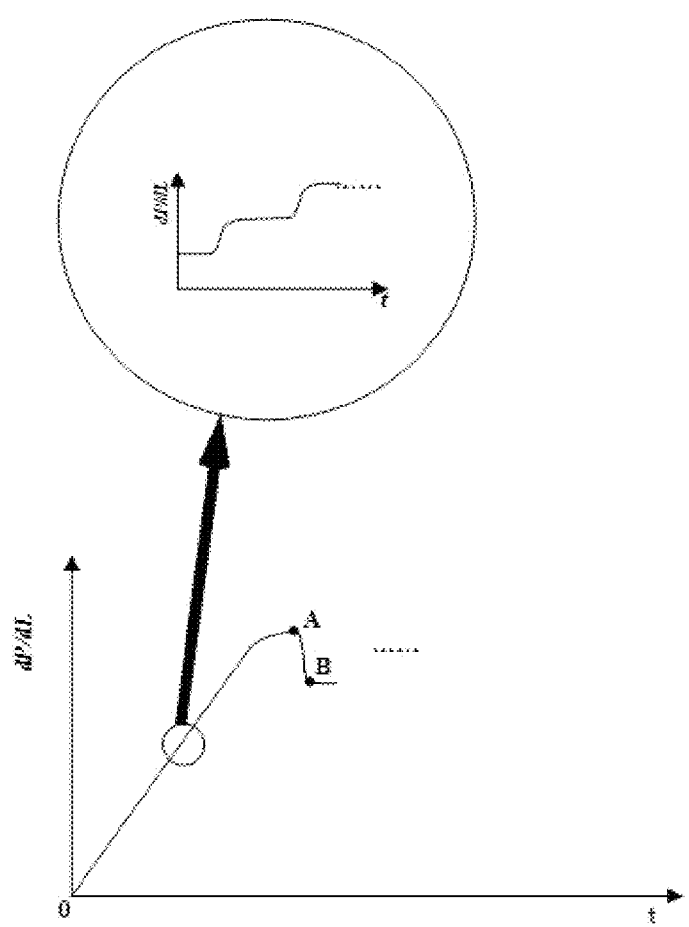
FIG. 5 is a schematic diagram illustrating a pressure gradient dynamic curve in one embodiment of the present application.

The pressure gradient dynamic curve is illustrated in FIG. 5, the pressure gradient constantly increases in a period of time corresponding to 0-A points. Considering that the second high-pressure injection pump operates in ladder boosting modes, the pressure gradient rises in ladder modes, as shown in the circle enlarged view in FIG. 5. After the point A, the experimental fluids overcome an internal drag of the rock core sample to flow out of the rock core sample, the pressure gradient is slightly declined, and enters a stable state after the point B.

Step 503: determining the moment when the flow is a non-zero value for the first time according to the flow dynamic curve, determining the pressure gradient corresponding to the moment according to the pressure gradient dynamic curve, determining the determined pressure gradient as a start-up pressure gradient if the pressure gradient corresponding to the moment is a peak value or stable value for the pressure gradient dynamic curve.

Assuming that the moment when the flow Q is a non-zero value for the first time is c, correspondingly, in FIG. 5, the pressure gradient corresponding to the moment c is a peak value of the pressure gradient dynamic curve, and therefore resulting that the start-up pressure gradient is the Y-coordinate value corresponding to the moment c.

Figure 1:
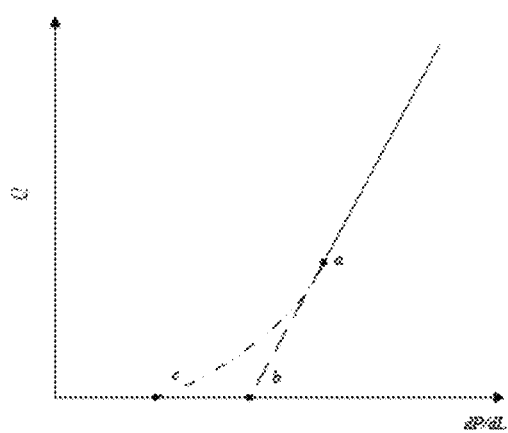
FIG. 1 is a schematic diagram illustrating a conventional principle of testing a start-up pressure gradient in the prior art.

This embodiment can realize measurements of pressure gradients in a non-flow region range (e.g., the range on the left of point c in FIG. 1), so as to obtain the real start-up pressure gradient with characteristics of high measurement accuracy and simple operations.

In one embodiment of the present application, the first ladder boosting mode and the second ladder boosting mode comprise an Equi-Flow intermittent injection mode and a ladder constant-pressure boosting mode, where the Equi-Flow intermittent injection mode is: the pump pressure-transmission liquids are stopped after being injected in an Equi-Flow manner over a first period of time, and are continuously injected in the Equi-Flow manner over the first period of time after stopping for a second period of time, the process is continuously reciprocated. Injection time and stopping time are determined depending on an injection rate of fluids, which is not construed as limiting in the present application.

To be specific, the pump pressure-transmission liquids push a piston upwards after being injected into the lower cavity of the first pressure-resistant piston container, moving the piston upwards can compress the gas in the upper cavity, compressing the gas in the upper cavity of the first pressure-resistant piston container can promote compression of the gas in the upper cavity of the second pressure-resistant piston container, compressing the gas in the upper cavity of the second pressure-resistant piston container can push the piston downwards, and then can inject the experimental fluids in the lower cavity of the second pressure-resistant piston container into a rock core sample.

In one embodiment of the present application, in order to realize an uninterrupted measurement, closing the third valve 8 and the fourth valve 9, opening the fifth valve 26 and the sixth valve 14, starting the high-pressure micro-flow pump 23 after the pressure-resistant capillary 24 are filled up with measurement fluids, so that the measurement fluids return to a head end of the pressure-resistant capillary 24; and closing the fifth valve 26, the sixth valve 14 and the high-pressure micro-flow pump 23, opening the third valve 8 and the fourth valve 9 once the resistance value the resistance measuring device 25 measures is an initial resistance value.

In one embodiment of the present application, calculating the apparent permeability in the above-mentioned Step 404 further comprising:

Step 601: calculating a flow rate according to the dynamic flow recorded after each boosting has stabilized, and calculating a pressure gradient according to the dynamic differential pressure recorded after each boosting has stabilized.

During implementation, calculating the flow rate by the equation below:

$$v_t = \frac{Q_t}{A};$$

where $v_t$ is the flow rate at t moment; A is the flow cross-sectional area of the rock core; and $Q_t$ is the dynamic flow at t moment.

Figure 6:
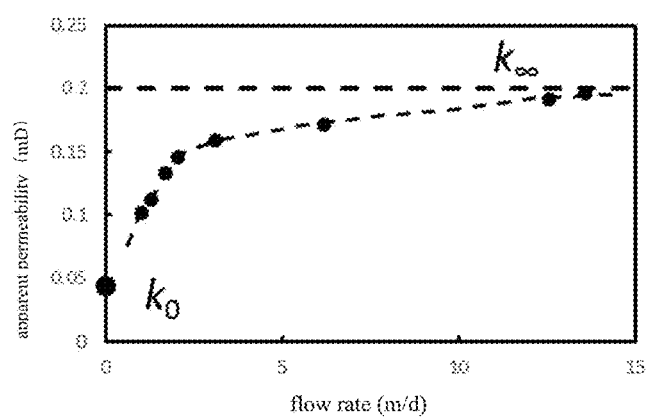
FIG. 6 is an actual measurement curve of apparent permeability of a tight rock core in different flow rates in one embodiment of the present application.

Step 602: fitting a relationship between the flow rate and the apparent permeability according to the flow rate and the apparent permeability. The relationship between the flow rate and the apparent permeability can be expressed by the flow rate-apparent permeability curve, as illustrated in FIG. 6, black circles are experimental data.

Determining a start-up permeability (the apparent permeability corresponding to when the flow rate approaches zero), a limit permeability (the apparent permeability corresponding to when the flow rate approaches infinity) and an attenuation coefficient of the apparent permeability according to the relationship between the flow rate and the apparent permeability.

Step 603: according to the rock core penetration theory, a calculation formula for obtaining apparent permeability of a tight rock core is given as follows:

$$k = 0, \qquad\qquad\qquad\qquad G \leq G_0$$
$$k = [k_\infty^{1/2} + (k_0^{1/2} - k_\infty^{1/2})\exp(cG)]^2, \quad G > G_0$$

where k is the apparent permeability; $k_\Psi$ is the limit permeability; $k_0$ is the start-up permeability; c is the attenuation coefficient of the apparent permeability; G is the pressure gradient; and $G_0$ is the start-up pressure gradient.

The embodiments of the present application further provide a storage media, such as ROM/RAM, magnetic disc, CD, etc., the storage media include a storage program, wherein the device where the storage media are located is controlled to execute steps of the method of measuring apparent permeability of the tight rock core according to any of the above embodiments when the program is run.

The embodiments of the present application further provide a processor used for running a program, wherein steps of the method of measuring apparent permeability of the tight rock core according to any of the above embodiments are executed when the program is run.

It is clear for those skilled in the art that the method embodiment of the present application can be provided as a computer program product. The present application can adopt a form of a computer program product implemented on one or more computer-usable storage media including computer-usable program codes (including but is not limited to magnetic disk storage, CD-ROM, optical memory, etc.). It should be understood that each flow and/or block in the flowchart and/or block diagram, and a combination of flows and/or blocks in the flowchart and/or block diagram are implemented by computer program instructions. These computer program instructions can be provided to processors of a general-purpose computer, a special-purpose computer, an embedded processing device or other programmable data processing devices to produce a machine, so as to produce an apparatus for achieving the functions specified in one or more flows of the flowchart and/or one or more blocks in the block diagram through the instructions executed by the processors of the computer or other programmable data processing devices.

These computer program instructions can also be stored in the computer-readable memory, which can guide operations of computers or other programmable data processing devices in a specific manner, so that the instructions stored in the computer-readable memory produce articles of manufacture including a command device that realizes functions specified in one or more flows of the flowchart and/or one or more blocks in the block diagram.

These computer program instructions can also be loaded into computers or other programmable data processing devices, so that a series of operating steps are performed on the computers or other programmable devices to achieve computer-implemented processing, therefore the instructions performed on the computers or other programmable devices provide steps for realizing the functions specified in one or more flows of the flowchart and/or one or more blocks in the block diagram.

The above-mentioned specific embodiments further demonstrate the objective, technical solutions and advantageous effects of the present application in detail. It should be understood that the foregoing is only the specific embodiments of the present application and not intended to limit the protection scope of the present application. Thus it is intended that the present application covers the modifications and variations of this application provided they come within the scope of the appended claims and their equivalents.

The invention claimed is:

1. An apparatus for measuring apparent permeability of a rock core, wherein the apparatus comprises: a rock core holder, a first injection pump, a second injection pump, a differential pressure meter, a flow meter, a first pressure control unit, a second pressure control unit, a first valve, a second valve, a third valve, and a fourth valve;

wherein the first pressure control unit comprises: a first pressure-resistant piston container and a second pressure-resistant piston container, both of which are divided into an upper cavity and a lower cavity by a piston, the upper cavities of the first pressure-resistant piston container and the second pressure-resistant piston container are filled with gases and communicate with each other, and the lower cavity of the first pressure-resistant piston container is filled with pump pressure-transmission liquids, and the lower cavity of the second pressure-resistant piston container is filled with experimental fluids;

wherein the second pressure control unit comprises: a third pressure-resistant piston container and a fourth pressure-resistant piston container, both of which are divided into an upper cavity and a lower cavity by a piston, the upper cavities of the third pressure-resistant piston container and the fourth pressure-resistant piston container are filled with gases and communicate with each other, and the lower cavity of the third pressure-resistant piston container is filled with pump pressure-transmission liquids, and the lower cavity of the fourth pressure-resistant piston container is filled with experimental fluids, and wherein the experimental fluids are selected from the group consisting of gas, oil, water, and polymer solutions;

wherein the upper cavities of the first and second pressure-resistant piston containers are connected with the upper cavities of the third and fourth pressure-resistant piston containers through the first valve, and the lower cavity of the first pressure-resistant piston container is connected with the second injection pump, the lower cavity of the second pressure-resistant piston container is connected with a first inlet of the rock core holder, the lower cavity of the third pressure-resistant piston container is connected with the second injection pump through the second valve, a first end of the flow meter is connected with the lower cavity of the fourth pressure-resistant piston container by the fourth valve, and a second end of the flow meter is connected with the outlet of the rock core holder by the third valve;

wherein the rock core holder accommodates a sample of the rock core;

wherein the first injection pump is connected with a second inlet of the rock core holder for adjusting a confining pressure;

wherein the second injection pump provides a pressure;

wherein the differential pressure meter is connected between the first inlet and the outlet of the rock core holder for measuring a dynamic differential pressure; and wherein the flow meter measures a dynamic flow.

2. The apparatus as claimed in claim 1, wherein the flow meter comprises: a first pressure-resistant container, a second pressure-resistant container, a flow pump, a pressure-resistant capillary, a resistance measuring device, a fifth valve and a calculator, wherein:

the first pressure-resistant container is filled with measurement fluids, one end of the first pressure-resistant container is connected with the outlet of the rock core holder by the third valve, and the other end of the first pressure-resistant container is connected with a head end of the pressure-resistant capillary;

the second pressure-resistant container is filled with gases, one end of the second pressure-resistant container is connected with the lower cavity of the fourth pressure-resistant piston container, and the other end of the second pressure-resistant container is connected with a head end of the pressure-resistant capillary by the fifth valve;

a tail end of the pressure-resistant capillary is connected with the flow pump, and connected with the lower cavity of the fourth pressure-resistant piston container by the fourth valve;

the resistance measuring device is electrically connected with the head end and the tail end of the pressure-resistant capillary by signal lines for measuring a resistance of fluids in the pressure-resistant capillary; and the calculator is electrically connected with the resistance measuring device for calculation of the dynamic flow according to the resistance value measured by the resistance measuring device.

3. A method of measuring apparent permeability of a rock core, comprising the steps of: providing the apparatus for measuring apparent permeability of a rock core according to claim 2;

loading the sample of the rock core into the rock core holder, and adjusting the confining pressure in the rock core holder with the first injection pump;

opening the third valve and the fourth valve, controlling the second injection pump for applying the pressure, so that experimental fluids in the lower cavity of the second pressure-resistant piston container are injected into the sample of the rock core, and stopping the second injection pump after the dynamic differential pressure measured by the differential pressure meter becomes stable, wherein the experimental fluids are selected from the group consisting of gas, oil, water, and polymer solutions;

closing the third valve and the fourth valve, opening the first valve and the second valve, controlling the second injection pump for applying the pressure so as to adjust the pressure in the first pressure control unit and the second pressure control unit to an experimental pressure, the experimental pressure is used for simulating formation pressure;

closing the first valve and the second valve, opening the third valve and the fourth valve, controlling the second injection pump to inject pump pressure-transmission liquids in a first ladder boosting mode, recording the dynamic differential pressure that the differential pressure meter measures and the dynamic flow that the flow meter measures after each boosting has stabilized; and calculating apparent permeability according to the dynamic differential pressure and the dynamic flow recorded after each boosting has stabilized.

4. The method as claimed in claim 3, further comprising prior to controlling the second injection pump to inject the pump pressure-transmission liquids in the first ladder boosting mode:

controlling the second injection pump to inject pump pressure-transmission liquids in a second ladder boosting mode, and recording the dynamic differential pressure the differential pressure meter measures and the dynamic flow the flow meter measures;

drawing a pressure gradient dynamic curve according to the recorded dynamic differential pressure, and drawing a flow dynamic curve according to the recorded dynamic flow;

determining a moment when the dynamic flow is the first non-zero value according to the flow dynamic curve; and determining a pressure gradient corresponding to the moment according to the pressure gradient dynamic curve, the pressure gradient corresponding to the moment is a start-up pressure gradient if the pressure gradient corresponding to the moment is a peak value or stable value for the pressure gradient dynamic curve.

5. The method as claimed in claim 4, further comprising the following steps after calculating apparent permeability:

calculating a flow rate according to the dynamic flow recorded after each boosting has stabilized, and calculating a pressure gradient according to the dynamic differential pressure recorded after each boosting has stabilized;

fitting a relationship between the flow rate and the apparent permeability according to the flow rate and the apparent permeability, and determining a start-up permeability, a limit permeability and an attenuation coefficient of the apparent permeability according to the relationship between the flow rate and the apparent permeability, wherein a calculation formula for obtaining apparent permeability of a rock core is given as follows:

$$k = 0, \qquad G \leq G_0$$
$$k = [k_\infty^{1/2} + (k_0^{1/2} - k_\infty^{1/2})\exp(cG)]^2, \quad G > G_0$$

where k is the apparent permeability; $k_\infty$ is the limit permeability; $k_0$ is the start-up permeability; c is the attenuation coefficient of the apparent permeability; G is the pressure gradient; and $G_0$ is the start-up pressure gradient.

6. The method as claimed in claim 3, wherein the second injection pump for applying the pressure is controlled so that experimental fluids in the lower cavity of the second pressure-resistant piston container are injected into the sample of the rock core, comprising:

controlling the second injection pump to inject the pump pressure-transmission liquids to the lower cavity of the first pressure-resistant piston container in a manner of constant flow rate or constant pressure, and injecting the experimental fluids in the lower cavity of the second pressure-resistant piston container the sample of the rock core via pressure transmission.

7. The method as claimed in claim 3, further comprising:

closing the third valve and the fourth valve, opening a fifth valve and a sixth valve, starting the flow pump after the pressure-resistant capillary in the flow meter are filled up with measurement fluids, so that the measurement fluids return to a head end of the pressure-resistant capillary; and closing the fifth valve, the sixth valve and the flow pump, and opening the third valve and the fourth valve, once the resistance value the resistance measuring device measures is an initial resistance value.

8. The method as claimed in claim 3, wherein the rock core has a permeability of between $10^{-5}$ mD and 10 mD.

9. The apparatus as claimed in claim 1, wherein the apparatus further comprises a sixth valve connected between the outlet of the rock core holder and the lower cavity of the fourth pressure-resistant piston container.

10. The apparatus as claimed in claim 1, wherein the apparatus further comprises a data collector electrically connected with the differential pressure meter and the flow meter for recording the dynamic differential pressure and the dynamic flow.

11. The apparatus as claimed in claim 1, wherein the apparatus further comprises: a controller electrically connected with the first injection pump, the second injection pump, the first valve, the second valve, the third valve and the fourth valve for controlling operations of the first injection pump and the second injection pump according to a user's setting, and opening or closing the first valve, the second valve, the third valve, and the fourth valve according to the user's setting.

12. The apparatus as claimed in claim 1, wherein the apparatus further comprises a thermostat container in which the rock core holder and the flow meter are arranged.

* * * * *